United States Patent [19]

Bilow et al.

[11] 4,075,111

[45] Feb. 21, 1978

[54] HEAVY METAL CHALCOGENIDE-POLYIMIDE LUBRICATIVE COMPOSITES

[75] Inventors: Norman Bilow, Encino; Michael N. Gardos, Culver City, both of Calif.

[73] Assignee: Hughes Aircraft Company, Culver City, Calif.

[21] Appl. No.: 678,285

[22] Filed: Apr. 19, 1976

[51] Int. Cl.² .................. C10M 5/00; C10M 7/00; F16D 69/00; F16C 0/00
[52] U.S. Cl. ............................................. 252/12
[58] Field of Search ............... 252/12, 12.2, 12.4, 252/12.6

[56] References Cited

U.S. PATENT DOCUMENTS

| | | | |
|---|---|---|---|
| 3,608,054 | 9/1971 | Alvino et al. | 252/12 |
| 3,629,103 | 12/1971 | Korshak et al. | 252/12 |
| 3,652,409 | 3/1972 | Mack et al. | 252/12 |
| 3,671,486 | 6/1972 | Dixon et al. | 252/12 |
| 3,781,205 | 12/1973 | Cairns et al. | 252/12.6 |
| 3,845,018 | 10/1974 | Bilow et al. | 260/47 CZ |
| 3,879,349 | 4/1975 | Bilow et al. | 260/47 UA |

Primary Examiner—Delbert E. Gantz
Assistant Examiner—Irving Vaughn
Attorney, Agent, or Firm—B. T. Hogan, Jr.; W. H. MacAllister

[57] ABSTRACT

Self-lubricating composites of high thermal stability, excellent frictional characteristics and wear resistance are formulated from molybdenum disulfide, tungsten disulfide, molybdenum diselenide and thermosetting acetylene-substituted polyimide oligomers.

4 Claims, 3 Drawing Figures

HEAVY METAL CHALCOGENIDE-POLYIMIDE LUBRICATIVE COMPOSITES

The invention herein described was made in the course of or under a contract with the United States Department of the Air Force

BACKGROUND OF THE INVENTION

1. Field of the Invention

This invention is related to the field of solid composite preparations generally and to the preparation of solid composites having self-lubricating and wear resistant characteristics in particular.

2. Prior Art

Those active in the field of tribology are forecasting a need for composite solid lubricants that are effective at temperatures up to 700° F. Such forecasts are based on future requirements for self-lubricating resin composites used in bearings for nuclear reactors, gas turbine engines, space vehicles, and high performance air frames. At present, commercially available self-lubricating composites do not perform satisfactorily at temperatures above 500° F (260° C). Moreover, at the high end of their temperature ranges, the wear rates of these composites are relatively high and their friction erratic. This limits their lubricating performance in low torque bearings and in dynamic seal components.

The appropriate lubricant filler and the geometry and composition of the reinforcing agent are important in influencing the high temperature tribological behavior of polymeric composites, but the controlling parameters are the thermal stability and strength of the base resin under load and high temperature. For example, Giltrow and Lancaster (Giltrow, J. P., and Lancaster, J. K., "Carbon Fibers in Tribology," Soc. Chem. Ind., Third Conf. on Carbons and Graphite, London, 1970) showed that the wear rates of PTFE and nylon at room ambient temperatures were higher than that of polyphenylene oxide, although all of these were reinforced with graphite.

Following their development, certain of the thermoplastic polymers, such as polyphenylene sulfide, nylon, "Teflon," and the polyimides, have been used as base binders or matrix resins for lubricating substances (additives such as $MoS_2$ or $WS_2$) and reinforcing agents. Some of the base binders themselves as well as some of the reinforcements were found to have inherently good lubricating qualities. Examples of binders with these characteristics are polytetrafluoroethylene, nylon, and polyimide. Examples of reinforcements are the Type I high elastic modulus graphite fibers.

In general, it can be concluded that self-lubricative polyimide composites prepared from condensation-type polyimides are known. However, these composites exhibit lower strength and wear life than composites of the instant invention, largely because of the presence of voids attributed to the liberation of gases during the cure of these materials.

Lubricative composites prepared from thermoplastic polyimides which depend solely upon a high glass transition temperature to provide high temperature properties exhibit the disadvantage of requiring unacceptably high fabrication temperatures ($\approx 700°$ F) as well as the disadvantage of deforming under load at high temperatures.

In those instances where conventional addition type polyimides, derived from bismaleimides, have been used to fabricate lubricative composites, the composites were found to be limited in their use to temperatures of less than 550° F and to exhibit marginal resistance to frictional heat which tends to increase the wear rates of the composites.

Applicants know of no lubricative composites which exhibit chemical, physical and thermal characteristics comparable to those of the instant invention.

THE INVENTION

Summary of the Invention

A new class of high strength self-lubricating composites having outstanding lubricating characteristics and wear resistance has been invented. The advantages are especially evident at high temperatures such as 600° – 700° F.

These composites are useful in the fabrication of gears, bearings, sleeves and other devices exposed under load to high temperatures and frictional resistances.

The invention is comprised of composites of cured acetylene-terminated polyimide oligomers filled with molybdenum disulfide, or various other chalcogenides such as tungsten disulfide, tungsten diselenide, and molybdenum diselenide in concentrations up to 70% by weight and cured at elevated temperatures under pressures ranging from several hundred (eg. 200 to 300 psi) to several thousand p.s.i.

When fully cured, the composites are machineable into useful articles of manufacture requiring high strength, thermal stability and self-lubricating properties.

DETAILED DESCRIPTION OF THE INVENTION

Figure 1:
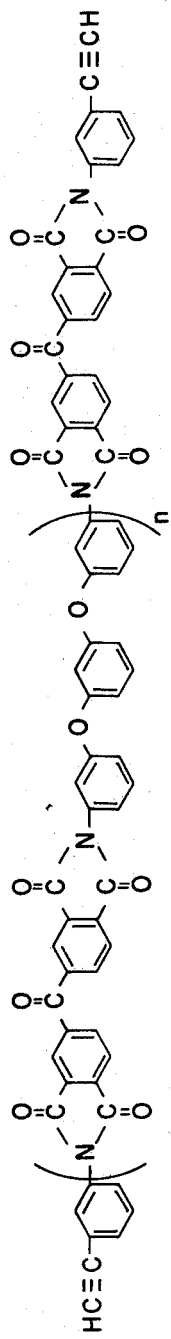
Figure 2:
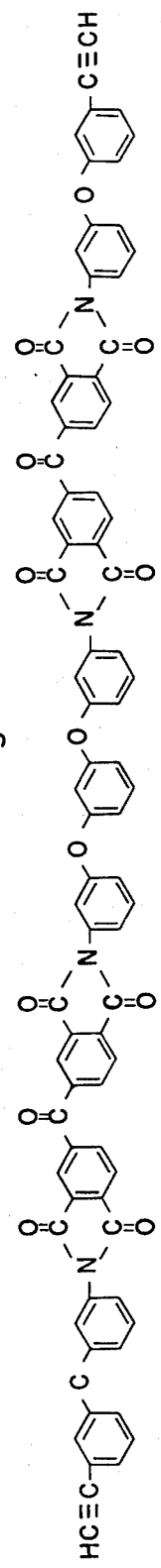
Figure 3:
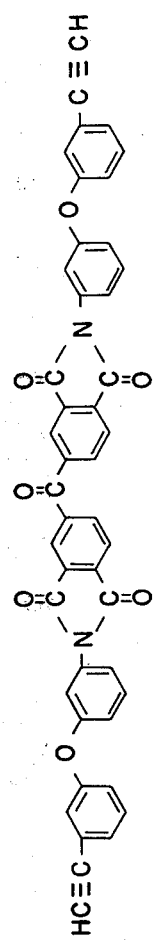

The objective of this invention is to provide self-lubricating composites having sufficient high temperature strength to render them useful for the fabrication of gears, bearings, sleeves, etc., to provide self-lubricating composites with outstanding thermal stability, to provide lubricative composites which are virtually void free and to provide moldable lubricative compositions which cure through an addition polymerization process to provide cured resin moldings which have superior lubricating characteristics when compared to prior art solid self-lubricating composites.

In seeking to achieve the above stated objectives, polyimide oligomers prepared by the teachings of U.S. Pat. Nos. 3,845,018 and 3,879,349, in which one of the instant inventors is also the coinventor, have been blended with molybdenum disulfide and other lubricating substances to form moldable lubricative composites which, when cured, exhibit exceptional properties exemplified by the properties presented in Tables I and II.

The outstanding characteristics of composites prepared in accordance with this invention may be attributed to the following facts: they are essentially void free; they are made from polyimides which are oxidatively, thermally and dimensionally stable to 700°–800° F; they are made from polyimides of extremely high strength which retain their high strength at high temperatures; and they contain lubricating additives which are stable to 700° F in air.

The polyimides which are used in this invention are those derived from polyimide oligomers having the following structures.

FIG.1

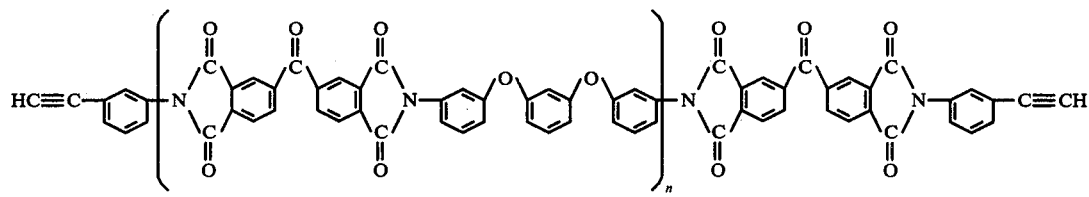

where $n$ usually is 1–3. When $n$ is 1 the resin is designated HR600. When $n$ is 2, the resin is designated HR602, etc.

FIG.2

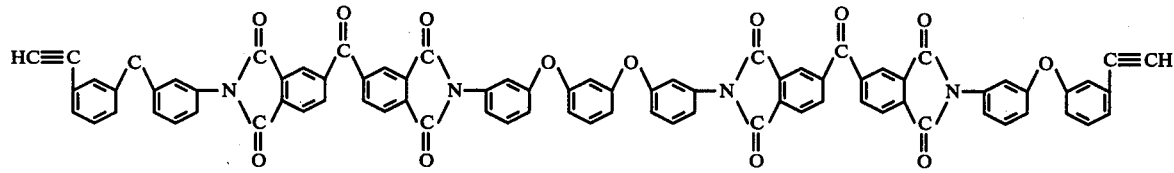

Other acetylene-terminated fully aromatic polyimide oligomers of the type defined in U.S. Pat. Nos. 3,845,018 and 3,879,349 have also been used.

Solid lubricative pigments such as $MoS_2$ and $WS_2$ are preferred. However, higher thermal stability substitutes for these materials such as certain other chalcogenide (e.g., tungsten disulfide, tungsten diselenide, molybdenum diselenide) may also be used.

The invention may be made by forming a finely pulverized blend of the solid lubricative pigment (10 – 60% by weight) and the polyimide oligomer. This blend is then molded at about 485° ± 15° F for about 2–4 hours at pressures ranging from about 200 to about 2000 psi and postcured for periods of 4 + ½ hours each at temperatures of 450°, 500°, 550°, and 600° F. Following the cure sequence, the composite is allowed to cool and may be machined to form usable specimens, bearings, gears, and other items. Other cure schedules may also be used.

Another way to make the invention is to form a mixture of approximately 85% of polyimide oligomer (finely powdered) approximately 15% lubricant pigment (finely powdered) in an inert suspension medium such as trichlorotrifluorethane (Freon TF) and wet-blend with a high speed blender. Following the mixing, or blending, the fluorocarbon is removed by air drying followed by vacuum drying. The dried mixture is then placed in a mold and preheated to approximately 485° F for 15 minutes at "contact pressure" (0–5 psi) before molding pressures of up to 300 psi are applied for periods of up to 6 hours. Post cures under pressure for periods of four hours each at temperatures of 485°, 500°, 550° and 600° F are employed as in the example above.

In some cases, a 600° F cure for up to 50 hours is desirable.

Lubricative composites comprised of 15% $MoS_2$ and HR 600 (polyimide of structure shown in FIG. 1) prepared by the wet-blend method described above were compared to other self-lubricating composites in Tables I, II and III. These tests were conducted on a LFW-1 friction and wear tester utilizing the following test parameters: Motion: Oscillating; Arc: 90°; Speed: 95 cpm (17 fpm avg.); Normal Load: 4 lbs. on 30–1 load lever system; Unit Load: 800 psi; Ring Material and Surface Finish: LFW-1 Alpha ring (SAE 4620 steel, $R_c$ 58–63) 11.0 ins O.D.; and Temperature, Humidity: Laboratory ambient.

The test results were compared to those of DuPont's "Vespel" SP-3 a commercially available lubricative composite and an inorganic fluoride impregnated graphite. The results of this comparison are shown in Table III, where the invention is described as "HR 600 + 15% $MoS_2$."In Tables I and II the results are compared to another commercial composite designated WDC 140.

It is evident from the test results shown in Table III that graphite was the poorest of the 3 solid lubricants and wore away more than 27 times as fast as our composite. This is even more significant when it is recognized that the graphite failed to complete the test. Furthermore, the Vespel SP-3 wore away 7.5 times more than our composite and exhibited a coefficient of friction 4.4 times higher than that of our composite, in spite of containing the same percentage of $MoS_2$.

The characteristics of the invention, when compared to those of prior art self-lubricative composites, can be classified as outstanding.

Having fully disclosed our invention and provided teachings which enable others to make the use it, the scope of our claims may be understood to be as follows:

TABLE I

LOAD CAPABILITY TESTS

Conditions: Temperature - 600° F.
Speed - 43.2 fpm (120 rpm)
Atmosphere - Air
Time - 60 min. at each load

| | | HR600/MoS$_2$ (85/15) * (wt. ratio) | | | | HR600/MoS$_2$ (60/40) * (wt. ratio) | | | | WDC-140 ** | | | |
|---|---|---|---|---|---|---|---|---|---|---|---|---|---|
| | | | Wear (mil/hr) | | Wear | | Wear (mil/hr) | | Wear | | Wear (mil/hr) | | Wear |
| Load (lb) | PV (psi) (fpm) | Friction Coefficient | Total Indicated | Terminal Value | Factor (10$^{-8}$ in/in) | Friction Coefficient | Total Indicated | Terminal Value | Factor (10$^{-8}$ in/in) | Friction Coefficient | Total Indicated | Terminal Value | Factor (10$^{-8}$ in/in) |
| 25 | 8,640 | 0.72–0.34–0.23 | 2.0 | 0.54 | 1.74 | 0.43–0.35 | 2.6 | 2.6 | 8.36 | 0.23 | .39 | 36.8 | 118 |
| 50 | 17,280 | 0.17 | 2.0 | 2.0 | 6.43 | 0.26–0.23 | 3.3 | 2.6 | 8.36 | 0.11$^a$ | 55$^{b,d}$ | — | 178$^b$ |
| 75 | 25,920 | 0.18–0.16–0.18 | 3.6 | 2.7 | 8.68 | 0.20–0.17 | 3.6 | 2.0 | 6.43 | | | | |
| 100 | 34,500 | 0.18–0.16 | 5.3 | 3.7 | 11.9 | 0.18–0.13 | 2.9 | 1.8 | 5.79 | | | | |
| 125 | 42,200 | 0.12–0.10 | 4.8 | 1.6 | 5.14 | 0.18–0.11 | 4.7 | 2.4 | 7.72 | | | | |
| 150 | 51,840 | 0.15–0.10 | 4.7$^c$ | 1.6 | 5.14 | 0.14–0.10 | 3.2 | 1.9 | 6.11 | | | | |
| 175 | 60,480 | 0.12–0.09–0.10 | 4.9 | 3.5 | 11.3 | 0.09 | 3.4 | 1.9 | 6.11 | | | | |
| 200 | 69,120 | 0.13–0.10 | 4.8 | 3.3 | 10.6 | 0.10–0.08 | 2.9 | 1.9 | 6.11 | | | | |
| 225 | 77,760 | 0.08–0.13–0.09 | 4.7 | 3.7 | 11.9 | 0.10–0.08 | 5.7 | 2.1 | 6.75 | | | | |
| 250 | 86,400 | — | — | — | — | 0.10–0.08 | 4.9 | 2.3 | 7.40 | | | | |
| 275 | 95,040 | — | — | — | — | 0.08 14 0.06 | 5.5 | 2.5 | 8.04 | | | | |
| 300 | 103,680 | — | — | — | — | 0.09–0.08 | 7.6$^c$ | 5.3 | 17.0 | | | | |

$^a$Stabilization temperatures (Shaft) with no heating or cooling.
HR 600/MoS$_2$ (85/15) 270° F.
HR 600/MoS$_2$ (60/40) 205° F.
$^b$Test duration - 18 min.
$^c$Cracks were observed at the rubbing interface, transverse to the sliding direction, after the test was completed.
$^d$Deformation from flow of the resin was observed at the sliding interface in the direction of sliding after the test was completed.
* HR 600 is the designation of the polyimide oligomer illustrated in FIG. 1.
** WDC-140 is a commercial composition comprised of MoS$_2$ and Sb$_2$O$_3$ in a matrix polyphenylene sulfide resin.

TABLE II

SPEED CAPABILITY TESTS
Conditions: Temperature - 600° F.
Load - 100 lbs.
Atmosphere - Air
Time - 60 min. at each speed

| Speed (fpm) | PV (psi) (fpm) | HR 600/MoS$_2$ (85/15) (wt. ratio) | | | HR 600/MoS$_2$ (60/40) (wt. ratio) | | | WDC-140 | | |
|---|---|---|---|---|---|---|---|---|---|---|
| | | Friction Coefficient | Wear (mil/hr) Total Indicated / Terminal Value | Wear Factor (10$^{-8}$ in/in) | Friction Coefficient | Wear (mil/hr) Total Indicated / Terminal Value | Wear Factor (10$^{-8}$ in/in) | Friction Coefficient | Wear (mil/hr) Total Indicated / Terminal Value | Wear Factor (10$^{-8}$ in/in) |
| 54 | 43,200 | 0.29-0.14 | 4.5 / 2.2 | 5.66 | 0.17-0.15 | 1.4 / 1.4 | 3.60 | 0.23-0.21 | 11.8 / 3.7 | 9.52 |
| 90 | 72,000 | 0.14-0.41-0.15 | 5.2 / 2.6 | 4.01 | 0.16-0.15 | 1.1 / 1.1 | 1.70 | 0.23-0.21 | 2.9 / 2.9 | 4.48 |
| 126 | 100,800 | 0.14-0.13 | 1.7 / 2.3 | 2.54 | 0.14-0.13 | 1.1 / 1.1 | 1.21 | 0.23-0.21 | 3.1 / 3.1 | 3.42 |
| 162 | 129,600 | 0.14 | 2.9* / 3.9 | 3.34 | — | — | — | 0.17 | 28.8$^c$ / 20.8 | 17.8 |

*Cracks were observed at the rubbing interface, transverse to the sliding direction, after the test was completed.

Table III
Results of Room Temperature Lubrication Tests on Solid HR600/MoS₂ Composites

| | COEFFICIENT OF FRICTION AFTER 100,000 CYCLES | COEFFICIENT OF FRICTION AFTER 120,000 CYCLES | % WT. CHANGE AFTER 120,000 CYCLES |
|---|---|---|---|
| HR 600/MoS₂ | 0.07 | 0.07 | 0.28 (1.0×)* |
| POLYIMIDE/MoS₂ (VESPEL-SP-3) | 0.31 | 0.31 | 2.09 (7.5×)* |
| GRAPHITE/LiF | 0.10 | SAMPLE CRUMBLED PRIOR TO COMPLETION OF TEST | 7.58 (27×)* |

*VALUES IN PARENTHESES ARE THE WT. CHANGE DIVIDED BY 0.28

We claim:

1. A self-lubricating composite comprised of an addition type polymerization polyimide taken from the group consisting of an acetylene-terminated polyimide oligomer selected from the group whose structures consist of:

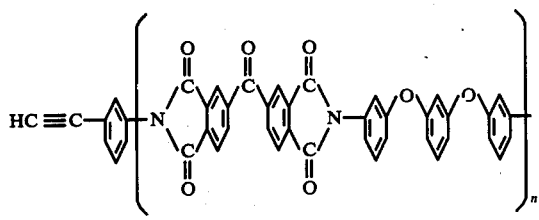

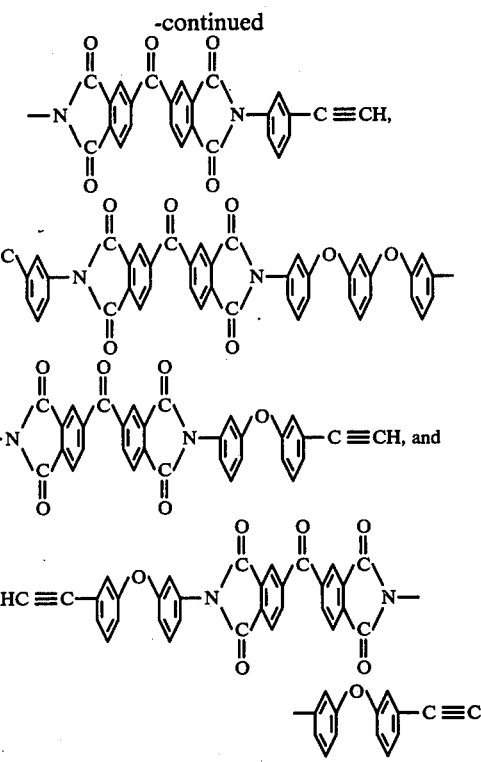

,where, N is 1-3, blended with a solid lubricative pigment taken from the group of heavy metal chalcogenides consisting of molybdenum disulfide, molybdenum diselenide, tungsten disulfide and diselenide and wherein the ratio of said polyimide to said pigment ranges from 90:10 to 30:70 percent by weight.

2. The composite of claim 1 wherein said polyimide oligomer has the formula:

FIG.1

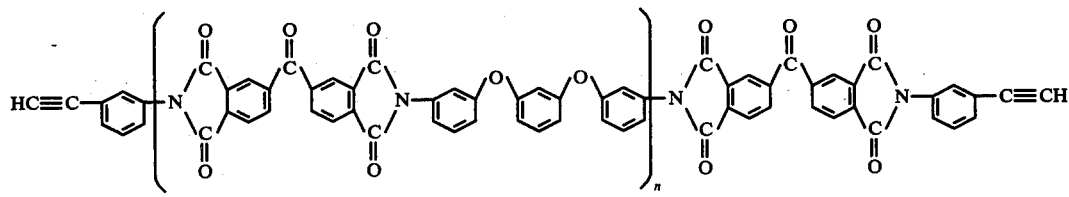

3. The composite of claim 2 wherein said pigment is MoS₂.

4. The composite of claim 2 wherein said pigment is WS₂.

* * * * *